Patented Sept. 12, 1933

1,926,797

UNITED STATES PATENT OFFICE 1,926,797

EPITHELIAL CELL-GROWTH STIMULANT

Leon E. Sutton, Syracuse, N. Y., assignor to The Chemical Foundation Incorporated, New York, N. Y., a corporation of Delaware No Drawing. Application May 20, 1932
Serial No. 612,641

5 Claims. (Cl. 167—58)

I have discovered that alpha thio-glycerol possesses the property of promoting the growth of the epithelial cells and of stimulating granulation in wounds.

The synthesis of this compound is accomplished by the reaction between alpha glycerol chlorhydrin and potassium or sodium hydrosulphide, preferably in alcoholic solution, to facilitate the separation of the product.

The equation for the reaction involved is:

$$CH_2.OH.CH.OH.CH_2Cl + KSH \rightleftarrows$$
$$CH_2OH.CH.OH.CH_2SH + KCl.$$

The completion of the reaction depends upon the use of a large excess of the metallic hydrosulphide.

A concentrated alcoholic solution of KOH is converted into the hydrosulphide by bubbling in the required amount of $H_2S$. The chlorhydrin is added in proportion to insure a large excess of the hydrosulphide and the reaction mixture is placed in a pressure bottle and kept in a water bath at about 70° C. until the reaction comes to an end. This is determined by observing the reaction flask for the amount of potassium or sodium chloride formed. When no more salt is observed to settle from the supernatant liquid, and when the precipitate no longer increases visibly in quantity the reaction is stopped. Approximately three days are required for the completion of the reaction.

The product is isolated from the reaction mixture as follows: The supernatant liquid is filtered to remove salt crystals and most of the alcohol is distilled off under reduced pressure. The hydrosulphide of glycerine is then thrown out of the alcoholic solution by anhydrous ether and shaken with fresh ether to remove any absorbed alcohol, and the two layers separated. Finally, the ether held in solution by the product is removed by distillation over a water bath and under reduced pressure.

As glycerol hydrosulphide oxidizes in air, contact with air must be reduced to a minimum. It is best preserved in brown, well-stoppered bottles, and at a low temperature.

Thio-glycerol when used on wounds shows about 12% decrease in the healing time of the treated wounds over the control wounds. The granulating surface remains red and relatively level when a 1 to 5000 solution of thio-glycerol in pure glycerine is used.

A 1 to 5000 solution in pure glycerine is used to stimulate epithelium growth. When stimulation of granulation is desired, the thio-glycerol is dissolved in 70% glycerine and 30% physiological solution. Four or five layers of gauze are moistened with the solution and placed over the wound (the wound having been previously freed of all necrotic tissue). Over the gauze is placed some impervious material, such as rubber dam or cellophane. The dressing is changed once a day.

The sulph-hydryl radical, (SH) substituted for one or all of the OH's of glycerine acts by supplying an essential to cell reproduction when prepared as above described. It is relatively stable when kept cool and away from air. When dissolved in 70% glycerine it is inhibitory to the development of bacteria. Obviously, it should not be applied to any malignant growth.

It may be pointed out that the use of the sulphhydryls as a stimulant of cell growths has been disclosed; also their use for the stimulation of wound-healing with the addition of an antiseptic, in the form of a water solution of thio-cresol. Thio-cresol, however, is subject to the objections of instability as thus used, and that its cresol content is liable to produce irritation. Thio-glycerol obviates these objections and combines the value of the physical properties of glycerine with the stimulant properties of the sulph-hydryls in one compound without the addition of any antiseptic or preservative.

As compared to thio-cresol, thio-glycerol has the advantage of markedly greater stability. As this cresol is diluted with water for application, due to evaporation, such application must be repeated every two hours, and the solution must be made up fresh every forty-eight hours. As the diluent of thio-glycerol is glycerine, the solution need be applied but once a day. It remains active for over a month if kept cool. Its comparative stability either in its pure form or when diluted with glycerine, is a great advantage over that of thio-cresol or any other sulph-hydryl combination known to applicant; and its stimulation effect is free from any liability to produce irritation. Its value and utility for the stimulation of wound-healing is believed to be broadly novel.

Having thus described my invention or discovery, I claim:

1. As a compound for the stimulation of epithelium growth and granulation in wounds, alpha thio-glycerol.

2. As a compound for the stimulation of epithelium growth and granulation in wounds, a dilute solution of alpha thio-glycerol.

3. A compound for the stimulation of epithelium growth in wounds consisting of a 1 to 5000 solution of alpha thio-glycerol in pure glycerine.

4. A compound for the stimulation of granulation in wounds consisting of alpha thio-glycerol dissolved in 70% glycerine and 30% physiological solution.

5. A therapeutic composition for wound-healing consisting of alpha thio-glycerol and glycerine.

LEON E. SUTTON.